US007748633B2

(12) United States Patent
Hasuike

(10) Patent No.: US 7,748,633 B2
(45) Date of Patent: Jul. 6, 2010

(54) MEDIUM MANAGEMENT SYSTEM, IMAGE FORMATION APPARATUS, PRINT MEDIUM, MEDIUM MANAGEMENT METHOD, AND PROGRAM

(75) Inventor: Kimitake Hasuike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 167 days.

(21) Appl. No.: 11/289,762

(22) Filed: Nov. 30, 2005

(65) Prior Publication Data
US 2007/0023522 A1 Feb. 1, 2007

(30) Foreign Application Priority Data
Jul. 27, 2005 (JP) ............ P2005-218047

(51) Int. Cl.
*G06K 19/00* (2006.01)
(52) U.S. Cl. ............ 235/487; 235/494; 283/74
(58) Field of Classification Search ............ 235/454, 235/462.31; 358/3.28, 448; 283/72–114
See application file for complete search history.

(56) References Cited

U.S. PATENT DOCUMENTS

| | | | | |
|---|---|---|---|---|
| 5,505,494 | A * | 4/1996 | Belluci et al. ............ | 283/75 |
| 5,548,390 | A * | 8/1996 | Sugisaki et al. ............ | 399/364 |
| 5,979,941 | A * | 11/1999 | Mosher et al. ............ | 283/67 |
| 6,067,385 | A | 5/2000 | Cullen et al. | |
| 6,348,980 | B1 | 2/2002 | Cullen et al. | |
| 6,727,996 | B1 * | 4/2004 | Silverbrook et al. ......... | 358/1.1 |
| 6,728,000 | B1 * | 4/2004 | Lapstun et al. ............ | 235/487 |
| 6,869,023 | B2 * | 3/2005 | Hawes ............ | 235/494 |
| 6,958,747 | B2 * | 10/2005 | Sahlberg et al. ............ | 345/173 |
| 6,995,874 | B1 | 2/2006 | Cullen et al. | |
| 2002/0040816 | A1 * | 4/2002 | Sahlberg et al. ............ | 178/18.01 |
| 2002/0054778 | A1 | 5/2002 | Ericson et al. | |
| 2003/0094492 | A1 * | 5/2003 | Kia et al. ............ | 235/454 |
| 2004/0195342 | A1 * | 10/2004 | Silverbrook et al. ......... | 235/494 |
| 2004/0210319 | A1 * | 10/2004 | Lapstun et al. ............ | 700/1 |
| 2005/0219616 | A1 * | 10/2005 | Furuta et al. ............ | 358/1.18 |
| 2006/0028689 | A1 * | 2/2006 | Perry et al. ............ | 358/3.28 |
| 2006/0279762 | A1 * | 12/2006 | Onishi ............ | 358/1.14 |
| 2009/0078475 | A1 | 3/2009 | Ericson et al. | |

FOREIGN PATENT DOCUMENTS

| | | |
|---|---|---|
| JP | 05-344271 | 12/1993 |
| JP | 07-227336 | 8/1995 |
| JP | 10-271318 | 10/1998 |
| JP | 10-307908 | 11/1998 |
| JP | 11-185045 | 7/1999 |
| JP | 2000-215000 | 8/2000 |

(Continued)

*Primary Examiner*—Seung H Lee
*Assistant Examiner*—Christle I Marshall
(74) *Attorney, Agent, or Firm*—Morgan, Lewis & Bockius LLP

(57) ABSTRACT

A medium management system includes an identification information acquisition unit that acquires first identification information uniquely identifying a first medium surface and second identification information uniquely identifying a second medium surface and being associated with the first identification information, and a code image generating unit that generates a first code image to be printed on the first medium surface from the first identification information, and a second code image to be printed on the second medium surface from the second identification information.

14 Claims, 10 Drawing Sheets

FOREIGN PATENT DOCUMENTS

| | | |
|---|---|---|
| JP | 2001-504404 | 4/2001 |
| JP | 2003-500939 | 1/2003 |
| JP | 2003-528388 A | 9/2003 |
| JP | 2004-282307 | 10/2004 |
| JP | 2005-115688 | 4/2005 |
| JP | 2005-293463 | 10/2005 |
| JP | 2006-127396 | 5/2006 |
| JP | 2006-268758 | 10/2006 |
| JP | 2006-323487 | 11/2006 |
| JP | 2008-547079 | 12/2008 |
| WO | 97/22959 | 6/1997 |
| WO | 98/23081 | 5/1998 |
| WO | 00/72576 A1 | 11/2000 |
| WO | 01/71475 A1 | 9/2001 |
| WO | 2006/135328 A1 | 12/2006 |

\* cited by examiner

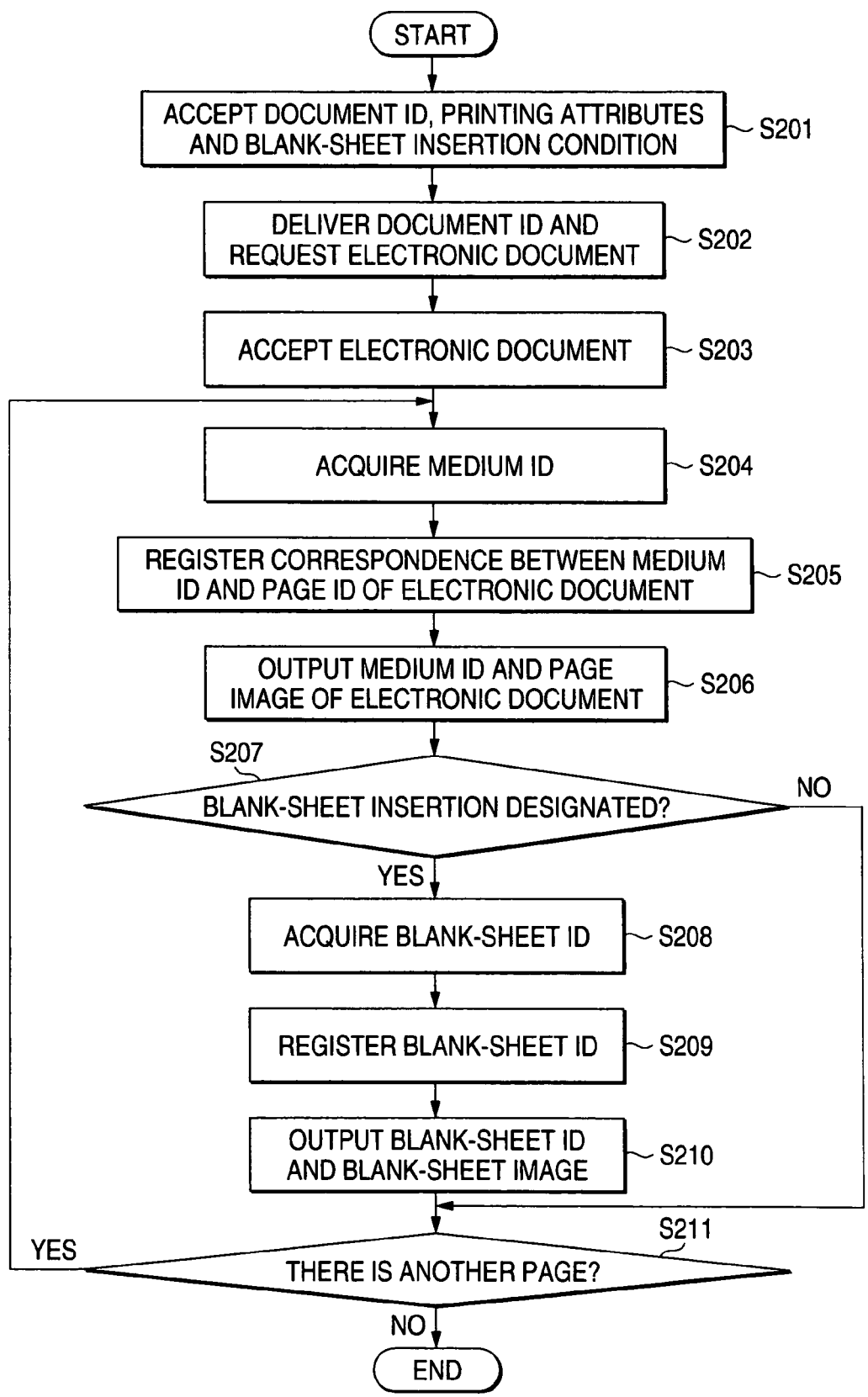

FIG. 5

| MEDIUM ID | PAGE ID |
|---|---|
| ⋮ | ⋮ |
| 000000500000 | docserver1.fujixerox.co.jp/Cabinet1/drawer1/folder1/document1.ppt#1 |
| 000000500002 | docserver1.fujixerox.co.jp/Cabinet1/drawer1/folder1/document1.ppt#2 |
| 000000500003 | |
| 000000500004 | docserver1.fujixerox.co.jp/Cabinet1/drawer1/folder1/document1.ppt#3 |
| 000000500006 | docserver1.fujixerox.co.jp/Cabinet1/drawer1/folder1/document1.ppt#4 |
| 000000500007 | |
| 000000500008 | docserver1.fujixerox.co.jp/Cabinet1/drawer1/folder1/document1.ppt#5 |
| 000000500010 | docserver1.fujixerox.co.jp/Cabinet1/drawer1/folder1/document1.ppt#6 |
| 000000500011 | |
| ⋮ | ⋮ |

MEDIUM MANAGEMENT SYSTEM, IMAGE FORMATION APPARATUS, PRINT MEDIUM, MEDIUM MANAGEMENT METHOD, AND PROGRAM

BACKGROUND OF THE INVENTION

1. Field of the Invention

The present invention relates to an image formation apparatus such as copying machine or printer, a medium management system which manages a medium for use in the image formation apparatus, and so forth.

2. Description of the Related Art

In recent years, notice is taken of a technique with which a user writes a character or depicts a picture on a special sheet of paper printed with fine dots, and he/she transfers the data of, e.g., the character written on the sheet of paper; to a personal computer, a portable telephone or the like, whereby the content can be saved or transmitted by mail. With the technique, the small dots are printed on the special sheet of paper at intervals of, for example, 0.3 mm, and they are formed so as to depict different patterns in all individual grids of predetermined size by way of example. The position of, e.g., the character written on the special sheet of paper can be specified by reading the dots with, for example, a dedicated pen which has a built-in digital camera, so that the character or the like can be utilized as electronic information.

In the related art, a document electronically stored is printed on a paper sheet which includes a position coding pattern. Also the technique employs the special paper sheet which includes the position coding pattern. The technique is such that the electronic document is printed on the paper sheet, that the printed document is manually edited using a digital pen which includes position-coding-pattern reading means, and a pen point with which a mark is put on the front surface of the paper sheet, and that the edited result is reflected on the electronic information. In the related art described above, it is also stated that the document information should desirably be printed together with the position coding pattern.

The related art described above, however, does not provide a way to associate the surfaces of a medium such as paper (herein below, termed "medium surfaces") to each other.

As the natural act of man, a note (an annotation) on document information is sometimes made on a blank-sheet part such as the rear surface of a page printed with the document information. Nevertheless, in the technique described above, the position coding pattern is printed on only the page which is printed with the document information, and it is not printed on the blank-sheet part of, for example, the rear surface of the page. Therefore, the medium surfaces are not associated with each other, and the annotation made on the blank-sheet part is not associated with the original document either. Accordingly, there is the problem that, even when a certain electronic document has been annotated, the annotation cannot be saved in association with the corresponding electronic document and cannot be displayed to together with the corresponding electronic document.

This problem can occur not only in the set of the medium surface printed with the document information and the blank medium surface for the annotation, but also in any other set of medium surfaces.

SUMMARY OF THE INVENTION

The present invention has been made in view of above circumstances and provides a medium management system.

According to an aspect of the present invention, a medium management system includes an identification information acquisition unit that acquires first identification information uniquely identifying a first medium surface, and second identification information uniquely identifying a second medium surface and being associated with the first identification information, and a code image generating unit that generates a first code image to be printed on the first medium surface from the first identification information, and a second code image to be printed on the second medium surface from the second identification information.

According to another aspect of the present invention, an image formation apparatus includes an identification information acquisition unit that acquires first identification information uniquely identifying a first medium surface, and second identification information uniquely identifying a second medium surface and being associated with the first identification information, a code image generating unit that generates a first code image from the first identification information, and a second code image from the second identification information, and an image formation unit that forms the first code image on the first medium surface, and the second code image on the second medium surface.

According to yet another aspect of the present invention, a print medium including at least one medium surface in which an image of a specified electronic document is printed, the print medium includes a first medium surface in which the image of the specified electronic document is not printed and a first code image to uniquely identify a medium surface is printed, and a second medium surface in which a second code image to uniquely identify a medium surface is printed in addition to the image of the specified electronic document.

According to still another aspect of the present invention, a medium management method includes the steps of acquiring first identification information that uniquely identifies a first medium surface, generating a first code image to be printed on the first medium surface from the first identification information, acquiring second identification information that uniquely identifies a second medium surface and is associated with the first identification information, and generating a second code image to be printed on the second medium surface from the second identification information.

According to still another aspect of the present invention, a storage medium readable by a computer, the storage medium storing a program of instructions executable by the computer to perform a function for managing a medium, the function includes the steps of acquiring first identification information that uniquely identifies a first medium surface, generating a first code image to be printed on the first medium surface from the first identification information, acquiring second identification information that uniquely identifies a second medium surface and is associated with the first identification information, and generating a second code image to be printed on the second medium surface from the second identification information.

BRIEF DESCRIPTION OF THE DRAWINGS

Embodiments of the present invention will be described in detail based on the following figures, wherein:

FIG. 4 is a flow chart showing an operation when the identification information management server in the embodiment of the invention generates correspondence information;

FIG. 5 is a diagram showing examples of the contents of a correspondence information DB in the embodiment of the invention;

DETAILED DESCRIPTION OF THE INVENTION

Now, the best mode for carrying out the present invention (herein below, termed "embodiments") will be described in detail with reference to the accompanying drawings.

First Embodiment

Figure 1:
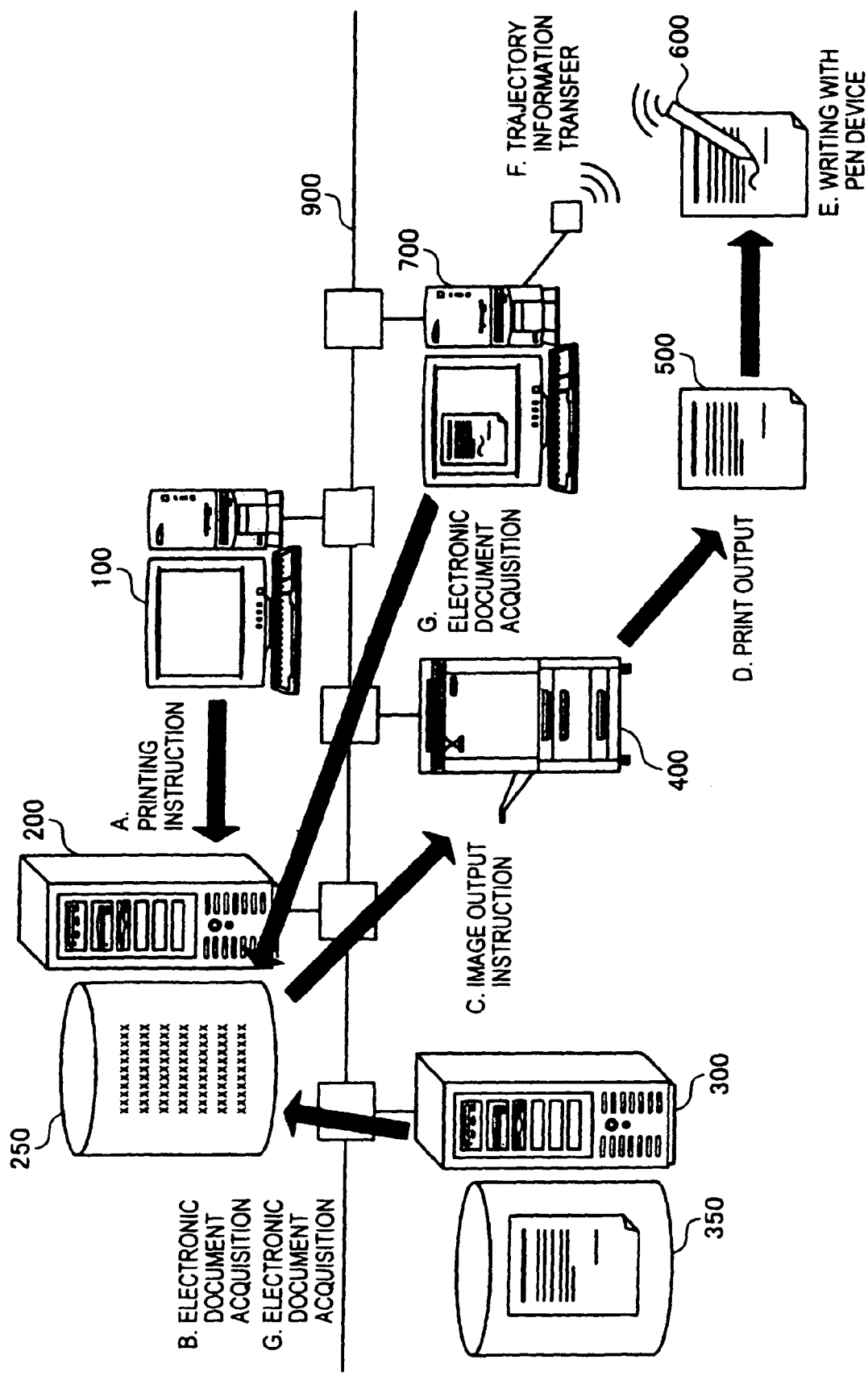
FIG. 1 is a diagram showing the general configuration of a system to which an embodiment of the present invention is applied.

FIG. 1 shows an example of the configuration of a system to which the first embodiment of the present invention is applied. The system includes at least, a terminal device 100 for instructing the print of an electronic document, an identification information management server 200 for managing identification information which is affixed to a medium in printing an electronic document, and for generating an image in which a code image containing the identification information is superposed on the image of the electronic document, a document management server 300 for managing the electronic document, and an image formation apparatus 400 for printing the image in which the code image is superposed on the image of the electronic document. All of the above are connected to a network 900.

Moreover, an identification information repository 250, which is a storage device for storing identification information, is connected to the identification information management server 200, and a document repository 350, which is a storage device for storing electronic documents is connected to the document management server 300.

Further, the system includes an item of printed matter 500 which is outputted by the image formation apparatus 400 in compliance with the instruction from the terminal device 100. The system also has a pen device 600 with which a character or a pattern is recorded on the printed matter 500 and which reads the record information of the character or pattern. Also connected to the network 900 is a terminal device 700 which displays the electronic document managed by the document management server 300 and the record information read by the pen device 600, in superposition.

In this specification the term "electronic document" is not limited to electronicized data of a "document" including a text. By way of example, the image data of a picture, a photograph, a pattern, etc. (irrespective of whether they are raster data or vector data), and other printable electronic data shall also be covered within the term "electronic document".

The operation of the system will be outlined below.

First, the terminal device 100 instructs the identification information management server 200 to print a code image in superposition on the image of an electronic document managed in the document repository 350 (A). Printing attributes such as the size and sense of a sheet of paper, scale-down/scale-up, "N-up" (print in which N pages of the electronic document are allocated within one page of the sheet of paper), double-sided print, and a blank-sheet insertion condition indicating in what aspect a blank sheet of paper for annotation is inserted are also inputted from the terminal device 100.

Thus, the identification information management server 200 acquires the electronic document in the printing instruction, from the document management server 300 (B). Besides, the management server 200 affixes the code image which contains identification information managed in the identification information repository 250 and position information determined in accordance with the printing attributes, to the image of the acquired electronic document, and it instructs the image formation apparatus 400 to print the resulting image (C). Here, the "identification information" is information for uniquely identifying individual media (sheets of paper) on which the images of electronic documents are printed, while the "position information" is information for specifying coordinate positions (X-coordinates and Y-coordinates) on the individual media.

Thereafter, the image formation apparatus 400 outputs the item of printed matter 500 in compliance with the instruction from the identification information management server 200 (D).

As will be detailed later, the image formation apparatus 400 is assumed to form the code image affixed by the identification information management server 200, as an invisible image by using an invisible toner, and to form the other image (the image of a part contained in the original electronic document) as a visible image by using a visible toner.

On the other hand, a user is assumed to have recorded a (handwritten) character or pattern on the printed matter 500 by using the pen device 600 (E). Thus, the imaging element of the pen device 600 grasps a certain region on the printed matter 500 so as to obtain position information and identification information. The trajectory information of the character or pattern as obtained on the basis of the position information is transferred to the terminal device 700 by radio or wire, together with the identification information (F). The invisible image is formed by employing the invisible toner whose absorption factor for infrared radiation is higher than a prescribed reference, whereby the invisible image can be read by the pen device 600, which is capable of projecting and sensing the infrared radiation.

Thereafter, the terminal device 700 transmits the identification information to the identification information management server 200 to make a request for the transmission of the electronic document corresponding to this identification information. Upon receiving the request, the identification information management server 200 acquires the electronic document corresponding to the identification information from the document management server 300, and then transmits the acquired electronic document to the terminal device 700 (G). As a result, the electronic document sent from the identification information management server 200 and the trajectory information sent from the pen device 600 are combined in the terminal device 700, and the combined information is displayed thereon. In this embodiment, the annotation and any electronic document relevant thereto are simultaneously displayed, as will be discussed later.

Such a configuration, however, is a mere example. For example, a single server may well be endowed with the function of the identification information management server 200 and that of the document management server 300. Moreover, the function of the identification information management server 200 may be performed by the image processing unit of the image formation apparatus 400. Further, the terminal devices 100 and 700 may well be configured as an identical terminal device.

Next, the outline of this embodiment will be described.

In this embodiment, not only is the image of an electronic document printed on a medium surface, but also a code image is printed on the "medium surface of a blank sheet of paper" (herein below, termed "blank-sheet surface") for annotating the electronic document. The medium surfaces are thus associated with of the print of the code image.

A first method for the annotation on the blank-sheet surface includes having the rear surface of a medium printed with the image of the electronic document as the blank-sheet surface for the annotation. Thus, when a blank sheet insertion condition is input from terminal device 100, the page on which the electronic document has been printed is designated in order to use the rear surface of this medium for the annotation. A second method includes using the front surface or rear surface of a blank medium, which is inserted separately from the medium, printed with the image of the electronic document. In this case, by way of example, which page of the electronic document is to be followed by the blank sheet is designated in the blank-sheet insertion condition, which is inputted from the terminal device 100.

Figure 2:
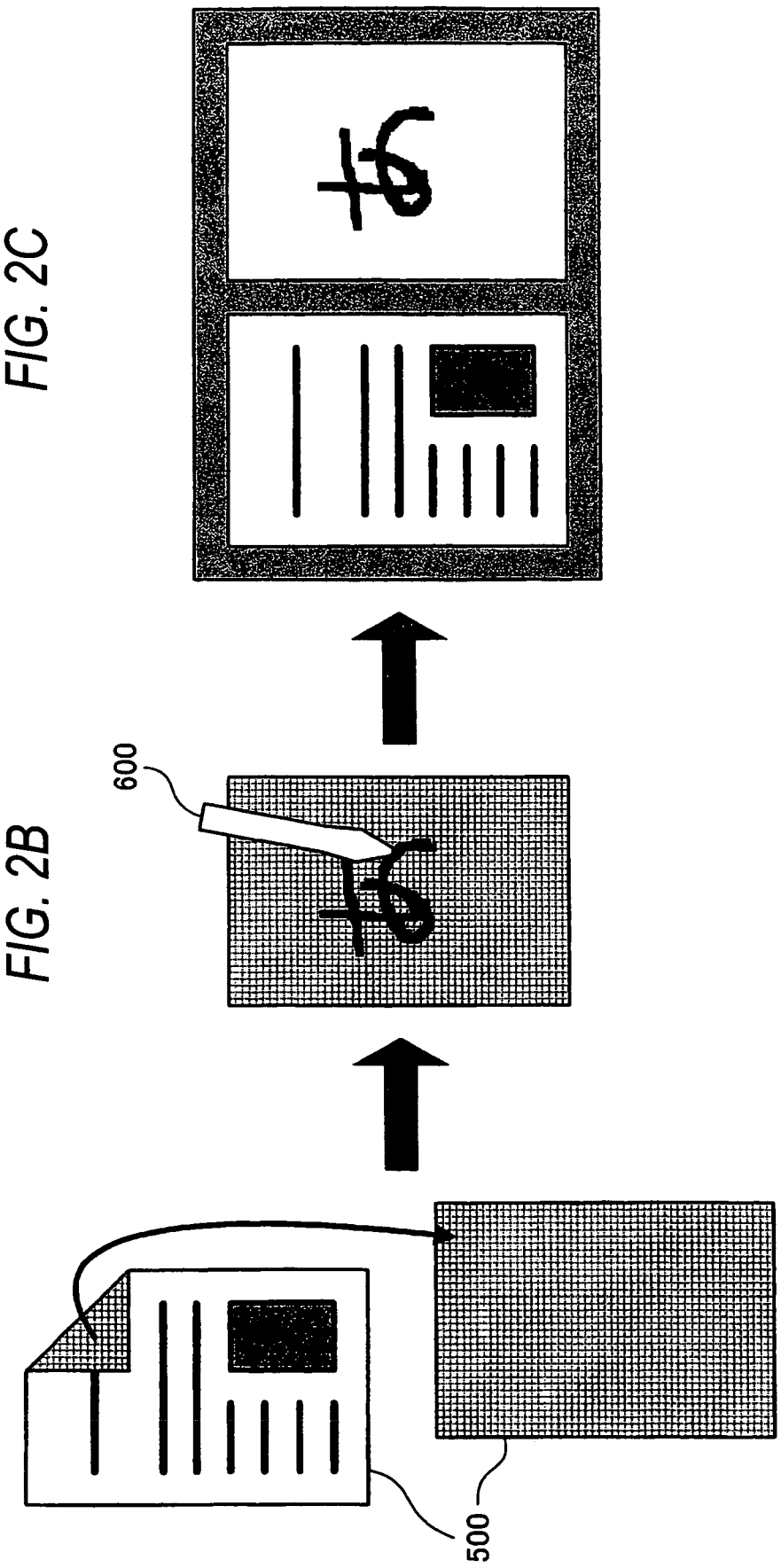
FIGS. 2A to 2C are diagrams for explaining the outline of the embodiment of the invention.

FIGS. 2A to 2C are diagrams schematically showing a flow in which the annotation is made by the first one of the annotation methods, and in which the result of the annotation is displayed.

First, the printed matter 500 whose front surface is printed with the image of the electronic document and whose rear surface is blank is outputted as shown in FIG. 2A. Here, it is assumed that the printed matter 500 is printed with the code image on both the front surface and rear surface thereof (in FIGS. 2A to 2C, only the code image of the rear surface is indicated by meshing).

Subsequently, as shown in FIG. 2B, the annotation is made on the rear surface of the printed matter 500 with the pen device 600.

Thus, as shown in FIG. 2C, the annotation written on the rear surface and the electronic document printed on the front surface are displayed in parallel on the screen of the terminal device 700.

Now, the configuration and operation of the system for incarnating the above operation will be described in more detail.

Figure 3:
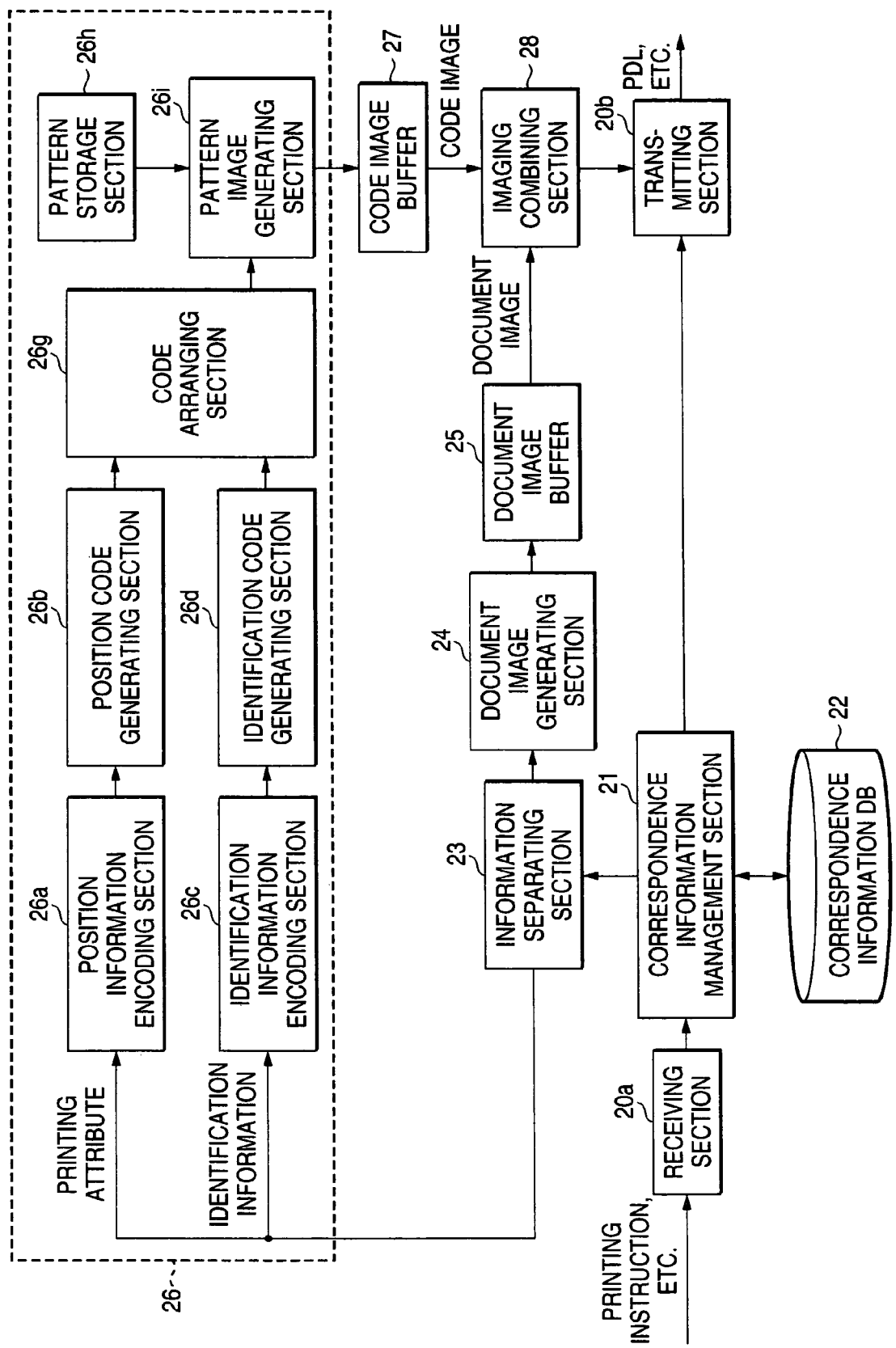
FIG. 3 is a block diagram showing the functional configuration of an identification information management server in the embodiment of the invention.

FIG. 3 is a diagram showing an example of the configuration of the identification information management server 200.

The identification information management server 200 includes a receiving section 20a, a correspondence information management section 21, a correspondence information database (DB) 22, an information extracting section 23, a document image generating section 24, a document image buffer 25, a code image generation section 26, a code image buffer 27, an image combining section 28, and a transmitting section 20b.

The code image generation section 26 includes a position information encoding section 26a, a position code generating section 26b, an identification information encoding section 26c, an identification code generating section 26d, a code arranging section 26g, a pattern storage section 26h, and a pattern image generating section 26i.

The receiving section 20a receives from the network 900 the printing instruction which has been sent from the terminal device 100, the electronic document which has been sent from the document management server 300, and the information items which have been acquired by the pen device 600 and which have been sent from the terminal device 700.

The correspondence information management section 21 registers information in the correspondence information DB 22, and reads out information from the correspondence information DB 22. Incidentally, the correspondence information management section 21 can also be grasped as an identification information acquisition section from the viewpoint of acquiring identification information which identifies a medium surface.

The correspondence information DB 22 is a database having a storage section which stores therein the correspondence between the identification information for identifying the medium surface (herein below, termed "medium ID") and the identification information of the electronic document that is the source of an image printed on the medium surface (herein below, termed "page ID"). The correspondence information DB 22 can also be grasped as a management unit from the viewpoint of managing the correspondence between the medium ID and the page ID.

The information extracting section 23 separates information delivered from the correspondence information management section 21, into information which is necessary for the generation of a document image, and information which is necessary for the generation of a code image.

The document image generating section 24 images the electronic document on the basis of the information necessary for the generation of the document image as has been separated by the information extracting section 23, and it stores the resulting image in the document image buffer 25.

The code image generation section 26 generates the code image on the basis of the information necessary for the generation of the code image as has been separated by the information extracting section 23, and it stores the generated image in the code image buffer 27.

The image combining section 28 combines the document image stored in the document image buffer 25, and the code image stored in the code image buffer 27.

The transmitting section 20b transmits an instruction for outputting the image combined by the image combining section 28, to the image formation apparatus 400 in a PDL (Page Description Language) represented by the "PostScript" or the like.

The position information encoding section 26a encodes position information in conformity with a predetermined encoding scheme. The encoding can employ, for example, the RS (Reed-Solomon) code or the BCH code which is a known error correcting code. Besides, as an error correcting code, the CRC (Cyclic Redundancy Check) or check sum value of the position information may well be computed so as to affix the value to the position information as a redundant bit. Also, the M-series code which is a kind of pseudo-noise series can be utilized as the position information. The M-series code performs encoding by utilizing the property that, when a partial series of length P is acquired from an M series of order P (having a series length of $2^{P-1}$), a bit pattern appearing in the partial series appears only once in the M series.

The position code generating section 26b translates the encoded position information into a form in which it is embedded as code information. By way of example, the positions of individual bits in the encoded position information can be replaced or encrypted by pseudo random numbers or the like so that decryption by a third party may become difficult. When position codes are arranged in two dimensions, bit values are arranged in two dimensions likewise to the arrangement of the codes.

When supplied with identification information, the identification information encoding section $26c$ encodes the identification information in conformity with a predetermined encoding scheme. The encoding can use the same scheme as used in the encoding of the position information.

The identification code generating section $26d$ translates the encoded identification information into a form in which it is embedded as code information. By way of example, the positions of individual bits in the encoded identification information can be replaced or encrypted by pseudo random numbers or the like so that decryption by a third party may become difficult. When identification codes are arranged in two dimensions, bit values are arranged in two dimensions likewise to the arrangement of the codes.

The code arranging section $26g$ combines the encoded position information and the encoded identification information which are arranged in the same forms as those of the codes, thereby to generate a two-dimensional code array which corresponds to an output image size. Codes obtained by encoding the position information items which are different depending upon the arrangement positions are used as the encoded position information, and codes obtained by encoding the information items which are identical irrespective of the positions are used as the encoded identification information.

The pattern image generating section $26i$ checks the bit values of array elements in the two-dimensional code array, and acquires a bit pattern image corresponding to the individual bit values from the pattern storage section $26h$. The bit pattern image is thus output as a code image into which the two-dimensional code array is imaged.

These functional parts are incarnated by the cooperation between software and hardware resources. Concretely, the unshown CPU of the identification information management server 200 (not shown) loads programs which incarnate the respective functions of the receiving section 20a, correspondence information management section 21, information extracting section 23, document image generating section 24, code image generating section 26, image generating section 28 and transmitting section 20b, from an external storage device into a main storage device, and it executes processes.

An operation in the case where the identification information management server 200 transmits an image output instruction to the image formation apparatus 400 in compliance with an instruction from the terminal device 100 is now described. Here, for the brevity of description, it is assumed that the "N-up" is not designated. In other words, it is assumed that one page of an electronic document is always printed on one medium surface, and that one medium surface is printed with only one page of the electronic document. Besides, although no limitation is originally imposed on the number of blank-sheet surfaces which are associated with one medium surface, it is assumed here for brevity sake that at most one blank-sheet surface is associated with one medium surface.

In the identification information management server 200, first of all, the receiving section 20a receives from the terminal device 100 a printing instruction which contains a document ID, printing attributes and a blank-sheet insertion condition. The receiving section 20A delivers the received information to the correspondence information management section 21.

Here, the "document ID" is information which uniquely identifies the electronic document, and a URL (Uniform Resource Locator) being the address information of the electronic document can be employed. Besides, as stated before, the "printing attributes" are attributes in a print mode, such as the size and sense of a sheet of paper, scale-down/scale-up, "N-up" and double-sided print. Further, in this embodiment, the receiving section 20a also receives the blank-sheet insertion condition indicating, for example, which page of the electronic document has been printed on a medium, whether to use the rear surface of the medium for annotation, or which page of the electronic document is to be followed by a blank sheet. To designate which page of the electronic document has been printed on the medium, whether to use the rear surface of this medium for the annotation, is effective when the double-sided print has been designated as the printing attribute.

Thus, the correspondence information management section 21 executes a process as shown in FIG. 4.

First, the correspondence information management section 21 accepts the document ID, printing attributes and blank-sheet insertion condition from the receiving section 20a (step 201). Subsequently, the correspondence information management section 21 holds these information items, and delivers the document ID to the transmitting section 20b and instructs this transmitting section 20b to transmit a request for the acquisition of the electronic document corresponding to the document ID (step 202). The transmitting section 20b having received the instruction requests the document management server 300 to transmit the electronic document.

Thus, the document management server 300 transmits the electronic document to-be-printed to the identification information management server 200, in which the receiving section 20a receives the electronic document and delivers it to the correspondence information management section 21.

Here, the process shifts to the processing of the correspondence information management section 21 again, and the correspondence information management section 21 accepts the electronic document from the receiving section 20a (step 203).

Besides, processing steps 204-211 are executed for page N which has been designated to be printed (N=1, 2, 3, . . . ).

First, the correspondence information management section 21 acquires identification information for use as a medium ID from the identification information repository 250 (refer to FIG. 1) (step 204). Moreover, it registers the correspondence between the medium ID and the page ID of the electronic document (step 205). In addition, the information management section 21 outputs the medium ID and the page image of the electronic document to the information extracting section 23 (step 206).

Subsequently, the correspondence information management section 21 decides if the insertion of a blank-sheet surface has been designated for the pertinent page (step 207). When, the insertion of the blank-sheet surface has not been designated, the process advances to the step 211. In contrast, when it is decided that the insertion of the blank-sheet surface has been designated, identification information for uniquely identifying the blank-sheet surface (herein below, termed "blank-sheet ID") is acquired from the identification information repository 250 (refer to FIG. 1) (step 208). Besides, the blank-sheet ID is registered in the correspondence information DB 22 (step 209). In addition, the blank-sheet ID and a blank-sheet image are outputted to the information extracting section 23 (step 210). Although the "blank-sheet image" has been assumed here, a white toner is consumed wastefully for an image smeared with only the white toner, and hence, a signal which indicates that no image is to be printed preferably should be outputted.

Further, the correspondence information management section 21 decides the presence or absence of any page not processed yet (step 211). With the presence decision, the process advances to the step 204, and with the absence decision, the process is ended.

A description of the correspondence information DB 22 in which the IDs have been registered at the steps 205 and 209 will now be described.

FIG. 5 is a diagram showing an example of the correspondence information DB 22.

As shown in the figure, the correspondence information DB 22 manages the medium ID and the page ID in association. As stated before, the medium ID is the information which uniquely identifies the medium surface that is printed with the electronic document. Moreover, the page ID is the information which uniquely identifies the page of the electronic document. This page ID can be expressed by, for example, a document ID and page No. as shown in the figure.

Meanwhile, in this embodiment, the medium surface to be printed with the electronic document and the blank-sheet surface for the annotation are associated in printing the code image. In FIG. 5, the association is made with the medium IDs. More specifically, letting (2×K) denote the medium ID of the medium surface to be printed with the image of the electronic document, the medium ID of the blank-sheet surface for making the annotation on the pertinent electronic document is set at (2×K+1) (K=0, 1, 2, 3, . . . ). That is, the two medium surfaces are associated in conformity with the rule that "two medium surfaces having medium IDs whose quotients in the cases of the divisions of the medium surfaces by 2 are equal are relevant".

However, when the rule is applied to all identification information items which are managed by the identification information management server 200, the identification information items where no blank-sheet surfaces are inserted become wasteful. In making such an association, therefore, the identification information items within a prescribed range preferably should be employed.

Thereafter, the identification information management server 200 operates as stated below. The printing attributes are assumed to be delivered from the correspondence information management section 21 to the information extracting section 23, though this has not been referred to in FIG. 4.

The information extracting section 23 separates the delivered information into information necessary for code generation (medium ID and printing attributes) and information necessary for the generation of a document image (electronic document), and it outputs the former to the code image generating section 26 and the latter to the document image generating section 24.

Thus, a medium address is encoded by the position information encoding section 26a, and a position code indicative of the encoded medium address is generated by the position code generating section 26b. The medium ID is encoded by the identification information encoding section 26c, and an identification code indicative of the encoded medium ID is generated by the identification code generating section 26d.

In addition, a two-dimensional code array corresponding to an output image size is generated by the code arranging section 26g, and a pattern image corresponding to the two-dimensional code array is generated by the pattern image generating section 26i.

On the other hand, the document image generating section 24 generates the document image or blank-sheet image of the electronic document.

Lastly, the document image or blank-sheet image generated by the document image generating section 24 and the code image generated by the code image generating section 26 before are combined by the image combining section 28, and the combined image is delivered to the transmitting section 20b. Thus, the transmitting section 20b transmits an instruction for outputting the combined image, to the image formation apparatus 400.

The image formation apparatus 400 prints the combined image of the document image of the electronic document to-be-printed and the code image on the medium in compliance with the image output instruction. The user obtains the printed matter 500.

Next, the image formation apparatus 400 will be described in detail.

Figure 6:
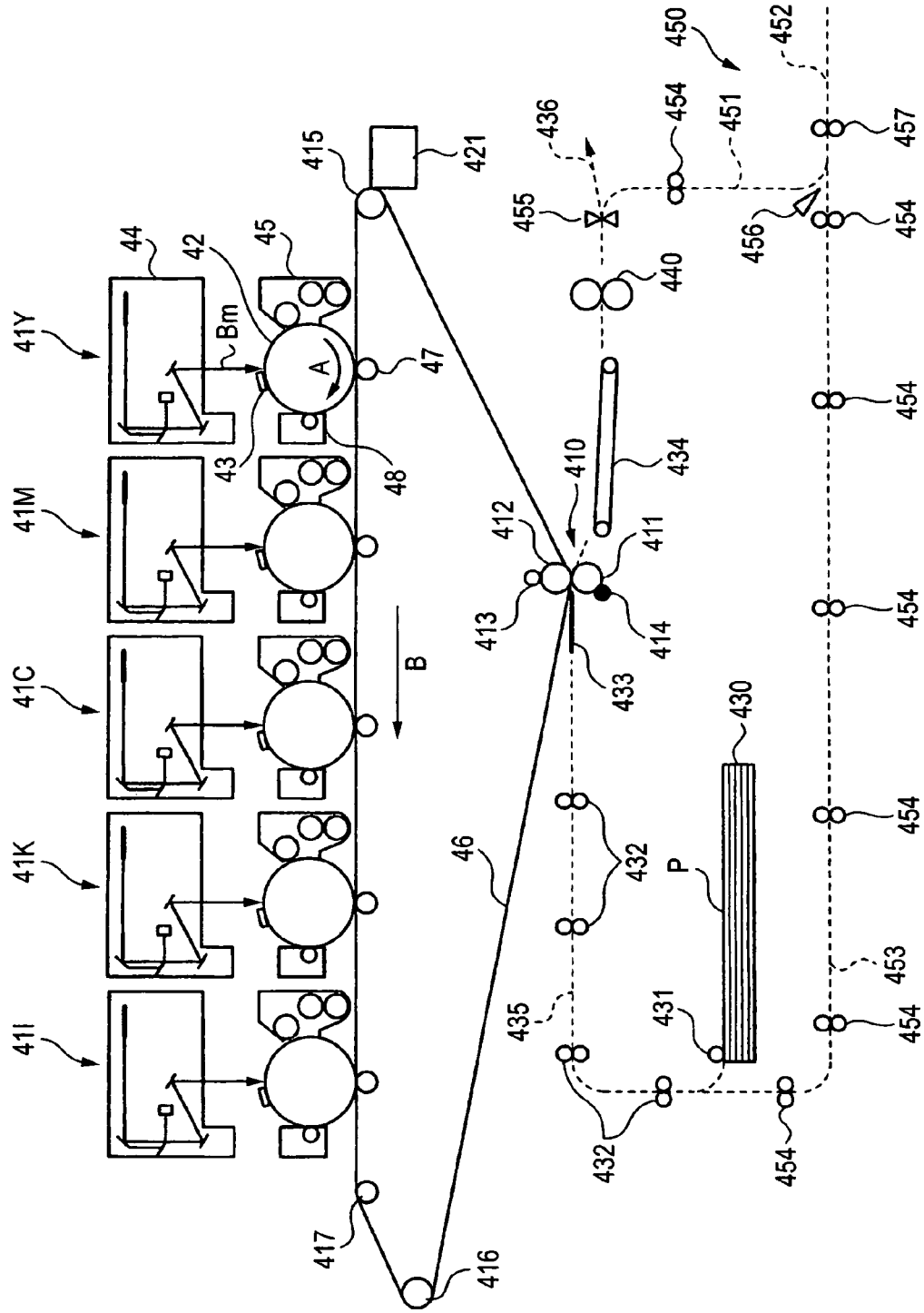
FIG. 6 is a diagram showing a configurational example of an image formation apparatus in the embodiment of the invention.

FIG. 6 is a diagram showing a configurational example of the image formation apparatus 400. The image formation apparatus 400 shown in FIG. 6 is an apparatus of so-called "tandem type". It includes, for example, plural image formation units 41 (41Y, 41M, 41C, 41K and 41I) in which toner images of respective color components are formed by an electrophotographic scheme, an intermediate transfer belt 46 onto which the toner images of the respective color components formed by the image formation units 41 are successively transferred (primarily transferred) so as to be held thereon, a secondary transfer device 410 in which the superposed images transferred on the intermediate transfer belt 46 are collectively transferred (secondarily transferred) onto a sheet of paper (medium) P, and a fixation device 440 which fixes the secondarily transferred images onto the sheet of paper P.

In the image formation apparatus 400, not only the image formation units 41Y, 41M and 41C which form the toner images of yellow (Y), magenta (M) and cyan (C) being ordinary colors, but also the image formation unit 41K which forms the toner image of black (K) having no absorption for infrared radiation, and the image formation unit 41I which forms the toner image being invisible are disposed as the image formation units which constitute a tandem.

In the image formation unit 41I, there is used a color material which absorbs the infrared radiation more than a Y toner, an M toner, a C toner and a K toner that are respectively used in the image formation units 41Y, 41M, 41C and 41K. Mentioned as such a color material is, for example, one which contains vanadyl naphthalocyanine. Incidentally, the K toner which is used in the image formation unit 41K should desirably be a color material which absorbs the infrared radiation less than the color material used in the image formation unit 41I, in order to facilitate the detection of the code image more. Here, it is also possible to use a conventional color material which absorbs the infrared radiation, such as a color material containing carbon.

In this embodiment, each of the image formation units 41 (41Y, 41M, 41C, 41K and 41I) is such that, around a photosensitive drum 42, which is rotated in the direction of arrow A, there are successively disposed the electrophotographic devices of an electric charger 43 which charges the photosensitive drum 42, a laser exposer 44 which writes an electrostatic latent image onto the photosensitive drum 42 (in the figure, an exposure beam is indicated by sign Bm), a developer 45 in which the toner of the corresponding color component is accommodated and which visualizes the electrostatic latent image on the photosensitive drum 42 with the toner, a primary transfer roll 47 by which the toner image of the corresponding color component formed on the photosensitive drum 42 is transferred onto the intermediate transfer belt 46, and a drum cleaner 48 which removes the toner remaining on the photosensitive drum 42. Such image formation units 41 are arranged in the order of the yellow (Y color), magenta (M color), cyan (C color), black (K color) and invisible (I color) image formation units as viewed from the upstream side of the intermediate transfer belt 46.

The intermediate transfer belt 46 is configured so as to be turnable in the direction of arrow B indicated in the figure, owing to various rolls. Included as the various rolls are a drive roll 415 which is driven by a motor not shown, so as to turn the intermediate transfer belt 46, a tension roll 416 which exerts a prescribed tension on the intermediate transfer belt 46 and which has the function of preventing the intermediate transfer belt 46 from meandering, an idle roll 417 which supports the intermediate transfer belt 46, and a backup roll 412 (to be stated later).

Voltages whose polarities are opposite to the charging polarities of the toners are applied to the primary transfer rolls 47, whereby the toner images on the respective photosensitive drums 42 are electrostatically attracted to the intermediate transfer belt 46 in succession, and the superposed toner images are formed on the intermediate transfer belt 46. Further, the secondary transfer device 410 includes a secondary transfer roll 411 which is arranged in pressed touch with the side of the toner image bearing surface of the intermediate transfer belt 46, and a backup roll 412 which is arranged on the side of the rear surface of the intermediate transfer belt 46 and which forms a counterelectrode to the secondary transfer roll 411. A metallic power feed roll 413 to which a secondary transfer bias is stably applied, is arranged in abutment on the backup roll 412. In addition, a brush roll 414 which removes stains having adhered to the secondary transfer roll 411 is arranged in touch with this secondary transfer roll 411.

A belt cleaner 421, which cleans the front surface of the intermediate transfer belt 46 after the secondary transfer, is disposed on the downstream side of the secondary transfer roll 411.

Further, in this embodiment, a sheet-of-paper conveyance system is constituted by a sheet-of-paper tray 430 which accommodates the sheets of paper P, a pickup roll 431 which picks up one of the sheets of paper P stacked in the sheet-of-paper tray 430, at a predetermined timing so as to convey the sheet of paper P, conveyance rolls 432 which convey the sheet of paper P delivered by the pickup roll 431, a conveyance chute 433 which feeds the sheet of paper P conveyed by the conveyance rolls 432, to the position of the secondary transfer by the secondary transfer device 410, and a conveyance belt 434 which conveys the sheet of paper P after the secondary transfer, to the fixation device 440.

Still further, in this embodiment, a double-sided mode in which toner images are formed on both the surfaces of the sheet of paper P can be executed in addition to a single-sided mode in which a toner image is formed on only one surface of the sheet of paper P. Therefore, the image formation apparatus 400 is provided with a sheet-of-paper reversal conveyance mechanism 450 which, when the double-sided mode is selected, reverses the sheet of paper P subjected to the fixation on one surface by the fixation device 440 and returns the sheet of paper P to the secondary transfer device 410 again. The sheet-of-paper reversal conveyance mechanism 450 is constructed of the continuous connection of a branch path 451 which branches below an ejection path 436 extending from the fixation device 440, a reversal path 452 which is stretched further rightward from the branch path 451, and a return path 453 which is formed so as to bend from the reversal path 452 and which returns from the sheet-of-paper tray 430 to a conveyance path 435. Here, each of the paths is provided with a suitable number of conveyance rolls 454 as may be needed. Besides, a first gate 455 which switches the conveyance direction of the sheet of paper P after the fixation, between the ejection path 436 and the branch path 451 is disposed on the exit side of the fixation device 440, and a second gate 456 which switches the conveyance direction of the sheet of paper P before and after the reversal is disposed at the branch point between the branch path 451 and the return path 453. Further, switch-back rolls 457 which are disposed so as to be capable of forward and reverse rotations are mounted on the reversal path 452.

Next, the image formation process of the image formation apparatus 400 will be described. When a start switch (not shown) is turned ON by the user, the predetermined image formation process is performed. Where the image formation apparatus 400 is configured as a color printer, digital image signals transmitted from the network 900 are temporarily accumulated in a memory, and the toner images of the respective colors are formed on the basis of the accumulated digital image signals of the five colors (Y, M, C, K and I).

More specifically, the image formation units 41 (41Y, 41M, 41C, 41K and 41I) are respectively driven on the basis of the image record signals of the respective colors obtained by image processing. Here, in the image formation units 41Y, 41M, 41C, 41K and 41I, the electrostatic latent images corresponding to the image record signals are respectively written onto the photosensitive drums 42 uniformly charged by the chargers 43, by the laser exposers 44. The written electrostatic latent images are respectively developed by the developers 45 in which the toners of the corresponding colors are accommodated, whereby the toner images of the respective colors are formed.

Further, the toner images formed on the photosensitive drums 42 are respectively primarily transferred from the photosensitive drums 42 onto the front surface of the intermediate transfer belt 46 by the primary transfer biases applied by the primary transfer rolls 47, at primary transfer positions at which the photosensitive drums 42 and the intermediate transfer belt 46 are held in touch. The toner images thus primarily transferred onto the intermediate transfer belt 46 are superposed on this intermediate transfer belt 46, and are conveyed to a secondary transfer position with the turning of the intermediate transfer belt 46.

On the other hand, the sheet of paper P is conveyed to the secondary transfer position of the secondary transfer device 410 at the predetermined timing, and the secondary transfer roll 411 nips the sheet of paper P relative to the intermediate transfer belt 46 (backup roll 412). Besides, the superposed toner images borne on the intermediate transfer belt 46 are secondarily transferred onto the sheet of paper P under the action of a secondary-transfer electric field which is established between the secondary transfer roll 411 and the backup roll 412.

Thereafter, the sheet of paper P on which the toner images have been transferred is conveyed to the fixation device 440 by the conveyance belt 434, and the toner images are fixed there. After the secondary transfer, the intermediate transfer belt 46 has the remaining toners removed by the belt cleaner 421.

When the both-sided mode is used in which images are formed on both the surfaces of the sheet of paper P, the distal end of the sheet of paper P having passed through the fixation device 440 is advanced into the branch path 451 by the first gate 455, and it is advanced into the reversal path 452 by the second gate 456 after having been conveyed along the branch path 451. In the reversal path 452, the sheet of paper P is once conveyed toward a deep side by the switch-back rolls 457, and it is once stopped at a timing which is immediately after the rear end of the sheet of paper P has passed through the second gate 456. Thereafter, the switch-back rolls 457 are reversely rotated at a predetermined timing, whereby the sheet of paper P is conveyed in the reverse direction in this case. At that time, the sheet of paper P is advanced into the return path 453 by the second gate 456 in this case, and it is returned to the conveyance path 435 through the return path 453. On this occasion, the sheet of paper P is in a state where its front and rear sides are reverse to those when it was first conveyed along the conveyance path 435. Besides, owing to the process described above, toner images are electrostatically transferred onto the rear surface of the sheet of paper P, and they are fixed by the fixation device 440, whereupon the sheet of paper P is ejected out of the apparatus through the ejection path 436.

Figure 7B:
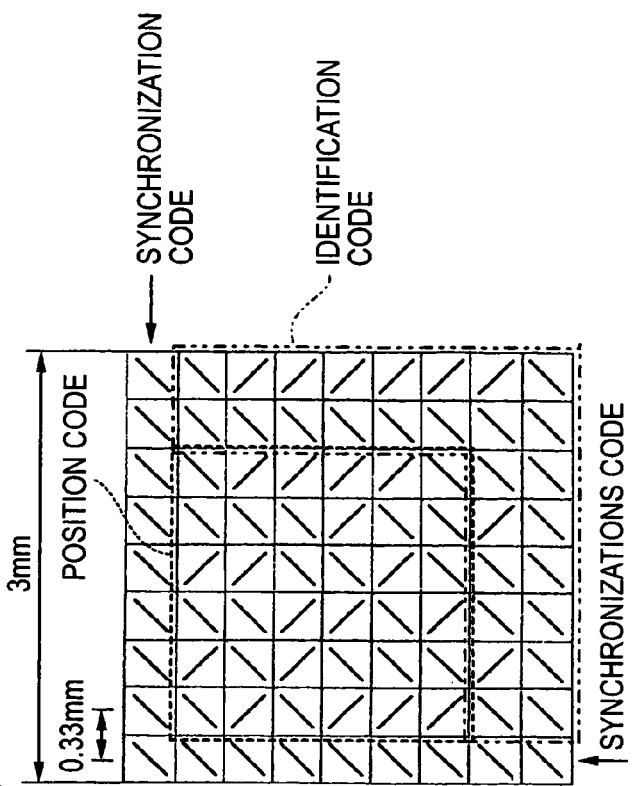
FIGS. 7A to 7C are diagrams for explaining a two-dimensional code image which is printed on a medium in the embodiment of the invention.
Figure 7A:
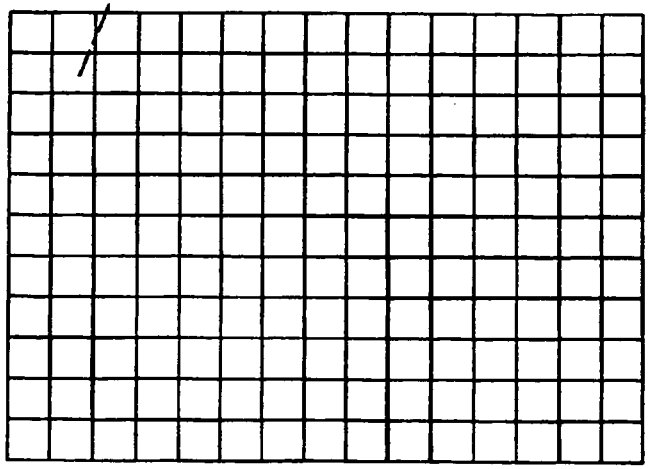
Figure 7C:
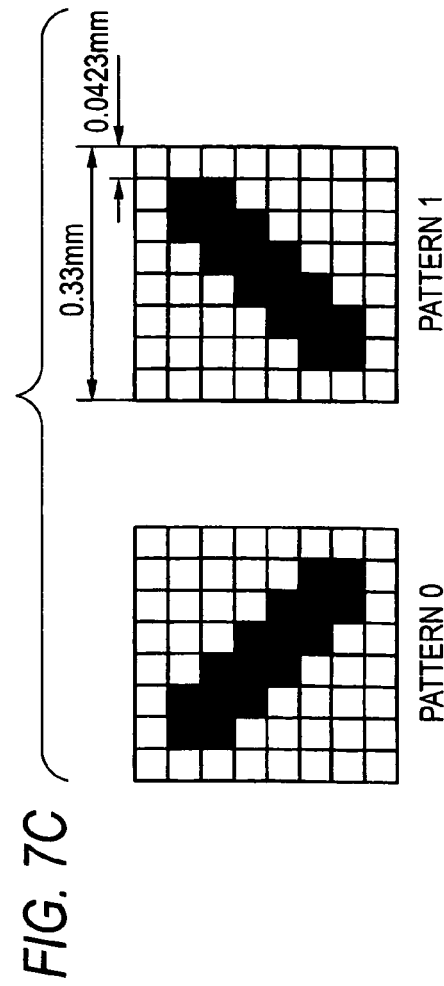

FIGS. 7A to 7C are diagrams for explaining a two-dimensional code image which is generated by the code image generation section 26 of the identification information management server 200, and which is printed by the image formation apparatus 400. FIG. 7A is the diagram in which the units of the two-dimensional code image formed and arranged by an invisible image are expressed in the shape of grids as a schematic illustration. FIG. 7B is the diagram showing one unit of the two-dimensional code image as which the invisible image is recognized by infrared irradiation. Further, FIG. 7C is the diagram for explaining the oblique line patterns of a backslash "\" and a slash "/".

The two-dimensional code image which is formed by the image formation apparatus 400 is formed using, for example, an invisible toner whose maximum absorption factor in a visible radiation region (400 nm-700 nm) is, for example, 7% or below, and whose absorption factor in a near-infrared region (800 nm-1000 nm) is, for example, 30. % or above. Besides, the invisible toner to be adopted should have mean variance diameters within a range of 100 nm-600 nm, in order to heighten a near-infrared radiation absorbability necessary for the machine reading of the image. Here, the "visible" and "invisible" conditions are of no concern if the image can be recognized by eye inspection. These "visible" and "invisible" conditions are distinguished depending upon if the image formed on the printed medium can be recognized in accordance with the presence or absence of a color developing property based on the absorption of a specified wavelength in the visible radiation region.

The two-dimensional code image shown in FIGS. 7A to 7C is formed of the invisible image which can be subjected to the machine reading based on the infrared irradiation and to an encoding process, stably for a long term, and which can record information at a high density. Besides, it is favorable that the invisible image can be provided at any desired region irrespective of that region of the front surface of the medium for outputting the image which is provided with the visible image. In this embodiment, the invisible image is formed on the whole area of one medium surface (paper surface) in conformity with the size of the medium to-be-printed. It is more favorable that the invisible image can be recognized by, for example, a luster difference in the eye inspection. In the above, the "whole area" does not signify all of the four corners of the sheet of paper. In the apparatus of the electrophotographic scheme or the like, the peripheral edge of the paper surface is often an unprintable area, so that the invisible image need not be printed in such an area.

The two-dimensional code pattern shown in FIG. 7B includes a region where a position code indicating a coordinate position on the medium is stored, and a region where an identification code for uniquely specifying the print medium is stored. Also, it includes regions where synchronization codes are stored. Besides, as shown in FIG. 7A, such plural two-dimensional code patterns are arranged, and two-dimensional codes in which different position information items are stored are arranged in the shape of the grids on the whole area of one medium surface (paper surface) in conformity with the size of the medium to-be-printed. That is, the plural two-dimensional code patterns each being as shown in FIG. 7B are arranged on one medium surface, and each of them includes the position code, the identification code and the synchronization codes. Here, the position information items, which are respectively different depending upon arrangement places, are stored in the regions of the plural position codes. In contrast, the identification information which is identical irrespective of arrangement places is stored in the regions of the plural identification codes.

Referring to FIG. 7B, the position code is arranged in a rectangular region of 6 bits×6 bits. Individual bit values are formed of plural minute line bit maps of different rotational angles, and a bit value "0" and a bit value "1" are respectively expressed by the oblique line patterns (pattern "0" and pattern "1") shown in FIG. 7C. More concretely, the bit "0" and the bit "1" are expressed using the backslash "\" and the slash "/" which have inclinations different from each other. Each oblique line pattern is formed having a size of 8×8 pixels at 600 dpi, and the oblique line pattern rising leftward (pattern "0") expresses the bit value "0", while the oblique line pattern rising rightward (pattern "1") expresses the bit value "1". Accordingly, information of one bit ("0" or "1") can be expressed by one oblique line pattern. Using the minute line bit maps which have such inclinations of two sorts, it is permitted to provide the two-dimensional code patterns which exert very little noise on the visible image, and with which a large quantity of information items can be digitized and embedded at a high density.

More specifically, the position information items totaling 36 bits are stored in the position code region shown in FIG. 7B. Among the 36 bits, 18 bits can be used for encoding an X-coordinate value, and the remaining 18 bits for encoding a Y-coordinate value. When all the pairs of 18 bits are used for encoding positions, $2^{18}$ (about 260 thousand) positions can be encoded. When each oblique line pattern is formed of 8 pixels×8 pixels (600 dpi) as shown in FIG. 7C, one dot of 600 dpi is 0.0423 mm long, and hence, the size of the two-dimensional code (including the synchronization codes) in FIG. 7B becomes about 3 mm (8 pixels×9 bits×0.0423 mm) in both length and width. When encoding 260 thousand positions at intervals of 3 mm, a length of about 786 m can be encoded. All of the 18 bits may be used for the encoding of the positions in this manner, or a redundant bit for error detection or error correction may well be included in the 18 bits in such a case where the detection errors of the oblique line patterns occur.

The identification code is arranged in a rectangular region of 2 bits×8 bits and 6 bits×2 bits, and it can store identification information totaling 28 bits. When using the 28 bits as the identification information, $2^{28}$ (about 270 million) identification information items can be expressed. Likewise to the position code, the identification code can include a redundant bit for error detection or error correction, in the 28 bits.

In the example shown in FIG. 7C, the two oblique line patterns have the angular difference of 90 degrees therebetween, but four sorts of oblique line patterns can be formed when an angular difference is set at 45 degrees. In case of such formation, information of two bits ("0"-"3") can be expressed by one oblique line pattern. In this way, that number of bits which is expressible can be enlarged by increasing the sorts of oblique line patterns based on an angular difference.

In the example shown in FIG. 7C, the encoding of the bit values has been described using the oblique line patterns, but patterns which can be selected are not restricted to the oblique line patterns. It is also possible to adopt a method in which, the encoding is based on the ON/OFF of dots or on the directions of shifting the positions of dots from a reference position.

Next, the pen device 600 will be described in detail.

Figure 8:
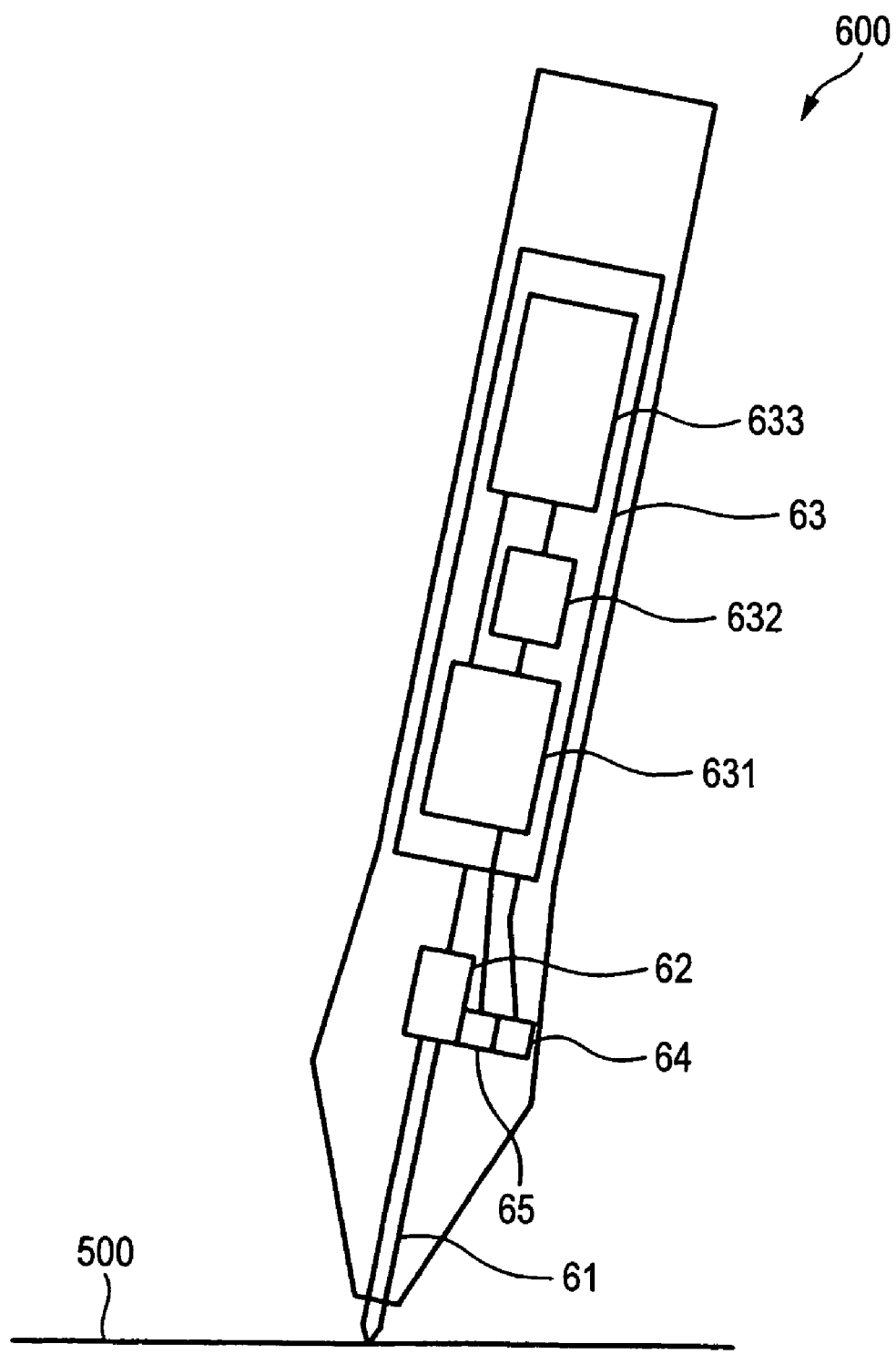
FIG. 8 is a view showing a configurational example of a pen device in the embodiment of the invention.

FIG. 8 is a view showing the configuration of the pen device 600.

The pen device 600 includes a writing portion 61 with which a character or a pattern is recorded by a manipulation similar to that of an ordinary pen. The pattern is recorded on a sheet of paper (medium) printed with a code image and a document image that have been combined, and a writing-pressure detection portion 62 which monitors the movement of the writing portion 61 so as to detect that the pen device 600 is pressed against the sheet of paper. The pen device 600 includes a control portion 63 which controls the electronic operation of the whole pen device 600, an infrared projection portion 64 which projects infrared radiation in order to read the code image on the sheet of paper, and an image input portion 65 which receives reflected infrared radiation, thereby to recognize and input the code image.

Here, the control portion 63 will be described in more detail.

The control portion 63 includes a code acquisition portion 631, a trajectory calculation portion 632 and an information storage portion 633. The code acquisition portion 631 is a portion which analyzes the image inputted from the image input portion 65, so as to acquire a code. The trajectory calculation portion 632 is a portion which corrects the deviation between the coordinates of the pen tip of the writing portion 61 and the coordinates of the image grasped by the image input portion 65, for the code acquired by the code acquisition portion 631, so as to calculate the trajectory of the pen tip. The information storage portion 633 is a portion which stores therein the code acquired by the code acquisition portion 631, and the trajectory information calculated by the trajectory calculation portion 632.

Figure 9:
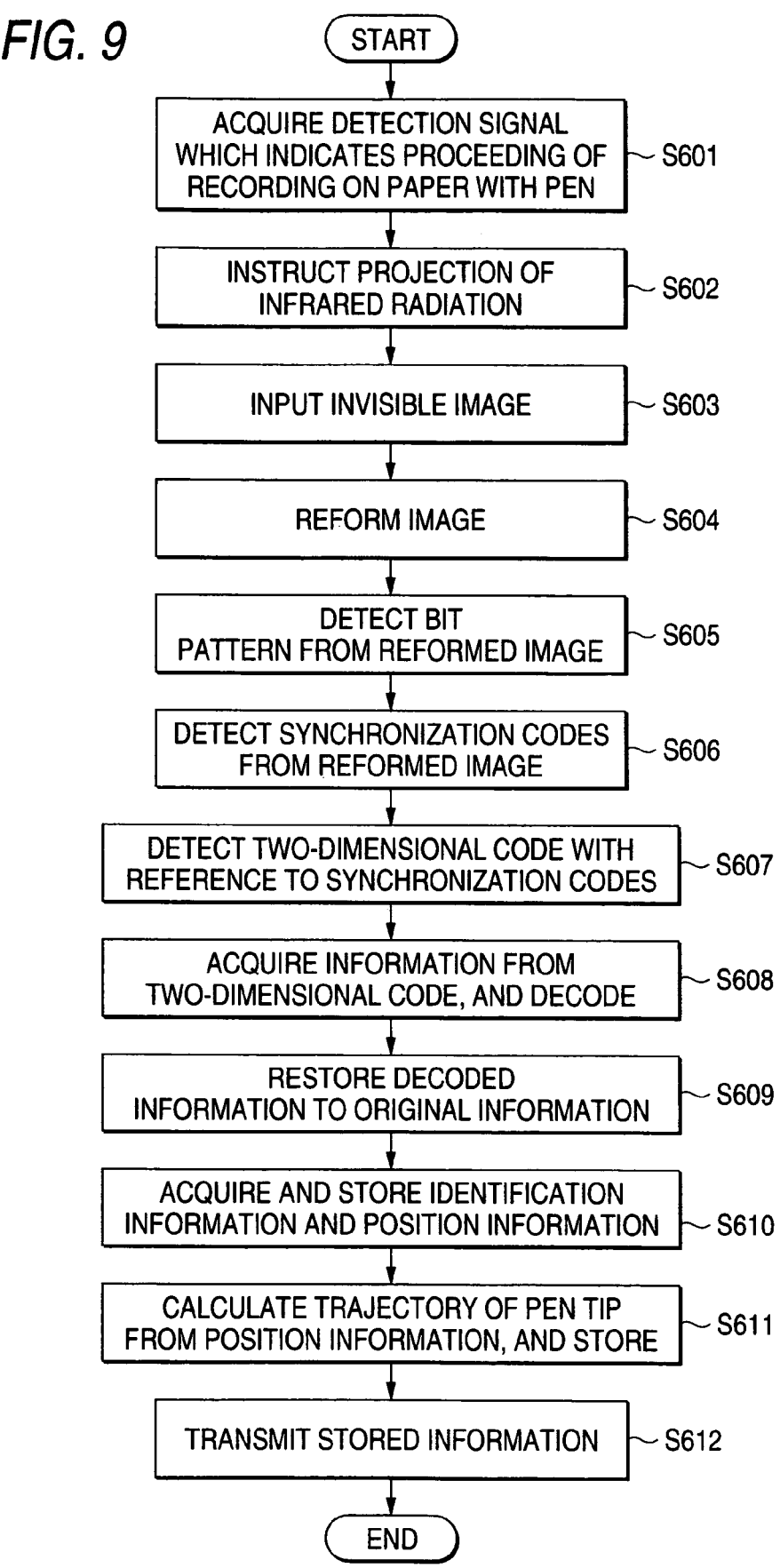
FIG. 9 is a flow chart showing the operation of the pen device in the embodiment of the invention.

FIG. 9 is a flow chart showing a process which is mainly executed by the control portion 63 of the pen device 600. When the pen device 600 is used for recording a character or a pattern on a sheet of paper by way of example, the control portion 63 acquires from the writing-pressure detection portion 62, a detection signal which indicates the proceeding of the recording on the sheet of paper with the pen (step 601). Upon detecting the detection signal, the control portion 63 instructs the infrared projection portion 64 to project infrared radiation onto the sheet of paper (step 602). The infrared radiation projected onto the sheet of paper by the infrared projection portion 64 is absorbed by an invisible image, and is reflected from any other part. The image input portion 65 receives the reflected infrared radiation, and it recognizes as the code image, the part from which the infrared radiation has not been reflected. The control portion 63 inputs (scans) the code image from the image input portion 65 (step 603).

Thereafter, code image detection processing indicated at steps 604-610 is executed in the code acquisition portion 631 of the control portion 63. First, the code acquisition portion 631 reforms the inputted scan image (step 604). The shaping of the scan image includes a slope correction, noise removal, etc. Besides, bit patterns (oblique line patterns) such as a slash "/" and a backslash "\" are detected from the reformed scan image (step 605). On the other hand, synchronization codes which are codes for positioning a two-dimensional code are detected from the reformed scan image (step 606). The code acquisition portion 631 detects the two-dimensional code with reference to the positions of the synchronization codes (step 607). Information such as an ECC (Error Correcting Code) is acquired from the two-dimensional code and is decoded (step 608). Further, the decoded information is restored to the original information (step 609).

In the code acquisition portion 631 of the control portion 63, position information and identification information are acquired from the code information restored in the above way, and the acquired information items are stored in the information storage portion 633 (step 610). On the other hand, the trajectory calculation portion 632 calculates the trajectory of the pen tip from the position information stored in the information storage portion 633, and it stores the calculated trajectory in the information storage portion 633 (step 611). Storage information items such as the identification information and the trajectory information, which are stored in the information storage portion 633, are transmitted to, for example, the terminal device 700 by wire or radio (step 612).

The terminal device 700 having received these information items performs the operation of acquiring an electronic document, which is managed by the document management server 300. Here, the correspondence between a medium ID, which is the identification information read from the sheet of paper (medium), and a page ID, which is the identification information of the page of the electronic document, is managed by the identification information management server 200, so that the terminal device 700 requests the identification information management server 200 to acquire the electronic document. It is assumed that, on this occasion, the medium ID and the trajectory information (position on the medium) are contained in the request for the acquisition of the electronic document, thereby to make also a request for superposing the character or the like recorded with the pen device 600, on the position of the electronic document corresponding to the trajectory on the medium.

In this embodiment, not only can such a request for acquiring the electronic document be made, but also a request for acquiring an electronic document to be annotated can be made by making the annotation on a blank sheet. More specifically, a blank-sheet ID and the trajectory information of the annotation are transmitted to the terminal device 700, and the terminal device 700 having received these information items acquires the electronic document to-be-annotated from among electronic documents managed by the document management server 300. For the same reason as stated above, however, the terminal device 700 requests the identification information management server 200 to acquire the electronic document.

In the identification information management server 200, the receiving section 20a receives the acquisition request and delivers the medium ID to the correspondence information management section 21.

Figure 10:
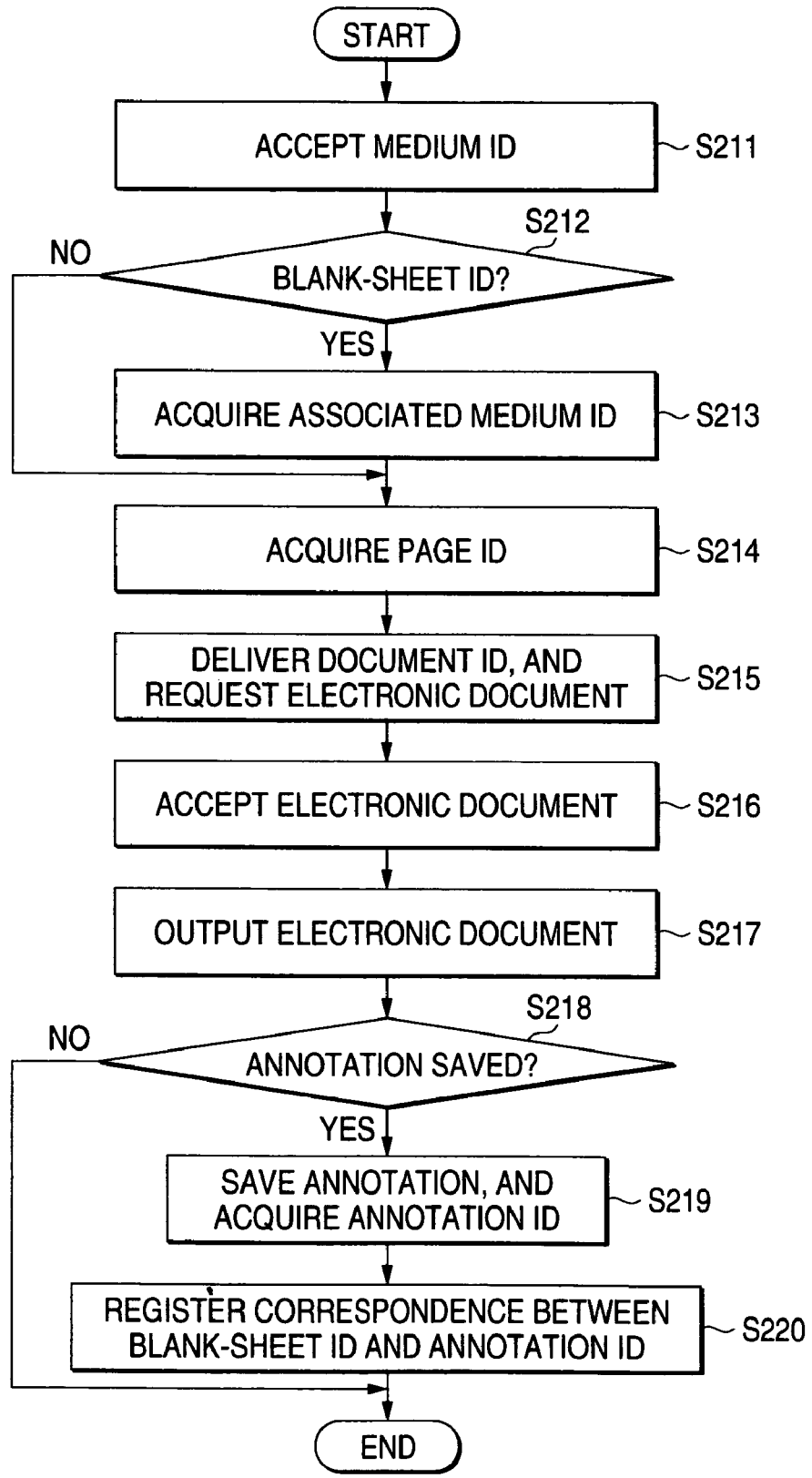
FIG. 10 is a flow chart showing the correspondence information utilizing and updating operation of the identification information management server in the embodiment of the invention.

Thus, the correspondence information management section 21 executes a process as shown in FIG. 10.

First, the management section 21 accepts the medium ID from the receiving section 20a (step 211). The management section 21 decides if the accepted ID is a blank-sheet ID affixed to a blank-sheet surface for annotation, with reference to the correspondence information DB 22 (step 212). In the example of FIG. 5, the accepted medium ID can be decided as the blank-sheet ID when any page ID is not associated with the accepted medium ID. Alternatively, the accepted medium ID can be decided as the blank-sheet ID when the accepted medium ID lies within a prescribed range and is an odd number.

Subject to the decision at the step 212 that the accepted medium ID is the blank-sheet ID, a medium ID associated with the blank-sheet ID is acquired in conformity with a rule (step 213), and a page ID associated with the medium ID is acquired (step 214).

In contrast, subject to the decision that the accepted medium ID is not the blank-sheet ID, a page ID associated with the accepted medium ID is acquired (step 214).

The correspondence information management section 21 delivers a document ID obtained from the page ID thus acquired, to the transmitting section 20b, and it instructs the transmitting section 20b to transmit a request for acquiring an electronic document which corresponds to the document ID (step 215). The transmitting section 20b having received the instruction requests the document management server 300 to transmit the electronic document.

Thus, the document management server 300 transmits the electronic document to-be-printed to the identification information management server 200, in which the receiving section 20a receives the electronic document and delivers the received document to the correspondence information management section 21.

Here, the process shifts to the processing of the correspondence information management section 21 again, and this correspondence information management section 21 accepts the electronic document from the receiving section 20a (step 216). The preferably management section 21 outputs the electronic document to the transmitting section 20b (step 217). The transmitting section 20b having received the instruction transmits the electronic document to the terminal device 700.

Thus, the annotation on the blank sheet, and also the electronic document to be annotated are displayed on the terminal device 700. Lastly, the terminal device 700 inquires of the user whether the annotation is to be saved as electronic data (step 218).

When the saving of the annotation has not been instructed, the process is directly ended.

In contrast, when the saving of the annotation has been instructed, the annotation is saved as the electronic data, and an annotation ID which uniquely identifies the location of the saving is acquired (step 219). A URL which is the address information of the saving location of the annotation data is exemplified as the annotation ID. Besides, in the correspondence information DB 22, the annotation ID acquired here is registered as a page ID which corresponds to the blank-sheet ID accepted at the step 211 (step 220). That is, although the page ID has not been registered for the medium ID of a blank-sheet surface in FIG. 5, the annotation ID is registered as the page ID at this stage.

The operation of this embodiment is thus ended.

In this embodiment, the medium surface for annotation has been assumed to be the "blank-sheet surface"; however, a medium surface which is formed with the image of a character, a symbol or a pattern that is not a hindrance to the annotation shall not be excluded.

Besides, in this embodiment, in registering the blank-sheet ID in the correspondence information DB 22, the column of the corresponding page ID has been blanked. At this point of time, however, an annotation ID may well be determined and registered as the page ID. In that case, when the medium ID has been decided as the blank-sheet ID at the step 212 in FIG. 10, not, only the page ID corresponding to the medium ID of the associated medium, but also the page ID corresponding to the blank-sheet ID is acquired.

Further, this embodiment has been described for when-the medium surface printed with the document image of the electronic document and the blank-sheet surface for annotation are associated in the print mode, but medium surfaces printed with the document images of electronic documents may well be associated with each other. When, for example, the specified page of a certain electronic document and the specified page of another electronic document are closely related and where they are to be simultaneously displayed, the medium surfaces can be associated with each other in printing the pages. Alternatively, blank-sheet surfaces may well be associated with each other.

Still further, in this embodiment, the document image and the code image have been generated and then combined in the identification information management server 200, but these operations may well be performed in the image processing section of the image formation apparatus 400 as already stated. In that case, the receiving section 20a in FIG. 3 becomes an accepting section which accepts the images to-be-printed from the scanning section, the communicating section, etc., not shown, of the image formation apparatus 400. Besides, the correspondence information items may be managed in the image formation apparatus 400, but they may well be transmitted to another computer (for example, the identification information management server 200) by the transmitting section 20b.

In the description thus far made, the medium IDs have been associated with each other by using the rule which concerns the notation of characters or symbols constituting the medium IDs, but information for the association may well be included in the correspondence information and be thus managed. For example, "Relevant medium ID" is provided in the correspondence information DB 22 in FIG. 5 so as to manage the association information by this item.

As stated above, in this embodiment, the identification information items for identifying the medium surfaces as associated with each other have been employed, and the code image to be printed on the medium surface has been generated from these identification information items. Owing to such a configuration, it has been permitted to associate the medium surfaces with each other.

Moreover, in this embodiment, it is also permitted to print the document image of an electronic document on one of the associated medium surfaces, to set the other medium surface as a blank sheet for annotation on the electronic document, and to associate the document image and the blank sheet.

Incidentally, the "first medium surface" and the "second medium surface" termed here shall not signify only the front surface and rear surface of one medium, but they shall signify any surfaces of any desired media.

Besides, as methods for associating the first identification information and the second identification information in this case, the following two are thought out by way of example: The first method is a method in which the first and second identification information items are associated in conformity with a predetermined rule that concerns the notation of a character or symbol constituting the identification information items. The second method is a method in which the first and second identification information items are associated by a database that holds the relevance between the identification information items.

The entire disclosure of Japanese Patent Application No. 2005-218047 filed on Jul. 27, 2005 including specification, claims, drawings and abstract is incorporated herein by reference in its entirety.

What is claimed is:

1. A medium management system, comprising:
    an identification information acquisition unit that acquires first identification information uniquely identifying a first medium surface of a certain medium, and second identification information uniquely identifying a second medium surface of the certain medium and being associated with the first identification information, wherein the second medium surface of the certain medium is a rear surface of the first medium surface of the certain medium;
    a database that associates the first identification information with annotation identification information corresponding to a handwritten annotation on the first surface of the certain medium;
    a code image generating unit that generates a first code image to be printed on the first medium surface from the first identification information, and a second code image to be printed on the second medium surface from the second identification information, wherein the first identification information and the second identification information are acquired by the identification information acquisition unit;
    a document image generation unit that generates a document image of an electronic document;
    an image combining unit that does not combine the first code image with the document image, and combine the second code image with the document image; and
    an image formation unit that forms the first code image on the first medium surface, and forms the second code image on the second medium surface to be superimposed on the document image.

2. The medium management system as defined in claim 1, wherein the first identification information and the second identification information are associated in conformity with a predetermined rule which concerns a notation of a character or a symbol constituting the first or second identification information.

3. The medium management system as defined in claim 1, wherein the first identification information and the second identification information are associated by the database which holds relevance between the first identification information and the second identification information.

4. The medium management system as defined in claim 1, further comprising:
    a receiving unit that receives the first identification information; and
    a first transmitting unit that transmits predetermined information concerning the second identification information, in accordance with receiving the first identification information by the receiving unit.

5. The medium management system as defined in claim 1, further comprising:
    a management unit that manages correspondence between the second identification information and the electronic document;
    a receiving unit that receives the first identification information; and
    a second transmitting unit that transmits the electronic document in accordance with receiving the first identification information by the receiving unit.

6. A medium management system as defined in claim 1, further comprising the database that registers the second identification information associated with a page of the electronic document.

7. An image formation apparatus comprising:
    an identification information acquisition unit that acquires first identification information uniquely identifying a first medium surface of a certain medium, and second identification information uniquely identifying a second medium surface of the certain medium and being associated with the first identification information, wherein the second medium surface of the certain medium is a rear surface of the first medium surface of the certain medium;
    a code image generating unit that generates a first code image to be printed on the first medium surface from the first identification information, and a second code image to be printed on the second medium surface from the second identification information, wherein the first identification information and the second identification information are acquired by the identification information acquisition unit;
    a database that associates the first identification information with annotation identification information corresponding to a handwritten annotation on the first surface of the certain medium;
    a document image generation unit that generates a document image of an electronic document;
    an image combining unit that does not combine the first code image with the document image, and combine the second code image with the document image;
    an image formation unit that forms the first code image on the first medium surface, and forms the second code image on the second medium surface to be superimposed on the document image; and
    a transmitting unit that transmits information indicating relevance between the first identification information and the second identification information to another computer.

8. An image formation apparatus as defined in claim 7, further comprising the database that registers the second identification information associated with a page of the electronic document.

9. A print medium including at least one medium surface in which an image of a specified electronic document is printed, the print medium comprising:
    a first medium surface on which the image of the specified electronic document is not printed, and on which a first code image to uniquely identify the first medium surface is printed;
    a second medium surface on which a second code image to uniquely identify the second medium surface is printed and superimposed on the image of the specified electronic document,
    wherein the second medium surface of a certain medium is a rear surface of the first medium surface of the certain medium.

10. A medium management method, comprising:
    acquiring first identification information that uniquely identifies a first medium surface of a certain medium;
    associating the first identification information with annotation identification information corresponding to a handwritten annotation on the first medium surface of the certain medium within a database;
    generating a first code image to be printed on the first medium surface from the acquired first identification information;
    acquiring second identification information that uniquely identifies a second medium surface of the certain medium and is associated with the first identification information;

generating a second code image to be printed on the second medium surface from the acquired second identification information;

wherein the second medium surface of the certain medium is a rear surface of the first medium surface of the certain medium;

generating a document image of an electronic document;

combining the second code image with the document image, without combining the first code image with the document image; and forming the first code image on the first medium surface, and forming the second code image on the second medium surface and superimposing on the document image.

11. The medium management method as defined in claim 10, further including the steps of:

registering correspondence between the second identification information and an electronic document;

receiving the first identification information;

specifying the second identification information that is relevant to the received first identification information; and transmitting the electronic document which corresponds to the specified second identification information.

12. A medium management method as defined in claim 10, further comprising the steps of:

registering the second identification information associated with a page of the electronic document within the database.

13. A storage medium readable by a computer, the storage medium storing a program of instructions executable by the computer to perform a function for managing a medium, the function comprising:

acquiring first identification information that uniquely identifies a first medium surface of a certain medium;

associating the first identification information with annotation identification information corresponding to a handwritten annotation on the first medium surface of the certain medium within a database;

generating a first code image to be printed on the first medium surface from the acquired first identification information;

acquiring second identification information that uniquely identifies a second medium surface of the certain medium and is associated with the first identification information;

generating a second code image to be printed on the second medium surface from the acquired second identification information;

wherein the second medium surface of the certain medium is a rear surface of the first medium surface of the certain medium;

generating a document image of an electronic document;

combining the second code image with the document image, without combining the first code image with the document image; and forming the first code image on the first medium surface, and forming the second code image on the second medium surface and superimposing on the document image.

14. A storage medium readable by a computer as defined in claim 13, further comprising the steps of:

registering the second identification information associated with a page of the electronic document within the database.

* * * * *